United States Patent
Rahman et al.

(10) Patent No.: US 9,944,248 B2
(45) Date of Patent: Apr. 17, 2018

(54) AIRBAG INCLUDING A SECONDARY PANEL EXTENDING ACROSS A VALLEY DEFINING A SECONDARY CHAMBER

(71) Applicant: Ford Global Technologies, LLC, Dearborn, MI (US)

(72) Inventors: Tahmidur Rahman, Canton, MI (US); Joseph Edward Abramczyk, Farmington Hills, MI (US); Matthew B. Makowski, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/252,352

(22) Filed: Aug. 31, 2016

(65) Prior Publication Data

US 2018/0056921 A1    Mar. 1, 2018

(51) Int. Cl.
  *B60R 21/233*    (2006.01)
  *B60R 21/213*    (2011.01)
  *B60R 21/231*    (2011.01)

(52) U.S. Cl.
  CPC ......... *B60R 21/233* (2013.01); *B60R 21/213* (2013.01); *B60R 21/23138* (2013.01); *B60R 2021/23324* (2013.01)

(58) Field of Classification Search
  CPC ............... B60R 21/233; B60R 21/213; B60R 21/23138; B60R 2021/23324
  See application file for complete search history.

(56) References Cited

U.S. PATENT DOCUMENTS

| | | | |
|---|---|---|---|
| 5,934,701 A | * | 8/1999 | Furukawa ............ B60R 21/231 280/729 |
| 6,254,121 B1 | * | 7/2001 | Fowler ................. B60R 21/233 280/729 |
| 6,554,313 B2 | | 4/2003 | Uchida |
| 6,851,706 B2 | | 2/2005 | Roberts et al. |
| (Continued) | | | |

FOREIGN PATENT DOCUMENTS

JP        2017094912 A      6/2017

OTHER PUBLICATIONS

Bohman, Katarina et al, "Reduction of Head Rotational Motions in Side Impacts Due to the Inflatable Curtain—A Way to Bring Down the Risk of Diffuse Brain Injury," Paper No. 98-S8-0-07, 16th ESV Conference, Jun. 1-4, 1998 Windsor Canada.

(Continued)

*Primary Examiner* — Drew J Brown
(74) *Attorney, Agent, or Firm* — Frank A. MacKenzie; Bejin Bieneman PLC

(57) ABSTRACT

An airbag includes a panel, a secondary panel, and an opening. The panel defines an inflation chamber inflatable to an inflated position and includes a valley in the inflated position. The secondary panel is connected to the panel on opposite sides of the valley and extends across the valley to define a secondary chamber between the secondary panel and the panel. The opening extends through the panel from the inflation chamber to the secondary chamber. During a vehicle impact, the momentum of the occupant may move the occupant towards the secondary panel. The secondary panel may absorb energy from the occupant and reduce or prevent the head of the occupant from rotating.

22 Claims, 9 Drawing Sheets

(56) References Cited

U.S. PATENT DOCUMENTS

| | | | |
|---|---|---|---|
| 7,264,269 B2* | 9/2007 | Gu | B60R 21/232 280/729 |
| 8,469,395 B2 | 6/2013 | Richez et al. | |
| 8,727,375 B2* | 5/2014 | Suzuki | B60R 21/233 280/730.2 |
| 9,016,717 B1 | 4/2015 | Clauser et al. | |
| 9,016,718 B2* | 4/2015 | Fukawatase | B60R 21/233 280/730.2 |
| 9,139,153 B2 | 9/2015 | Deng et al. | |
| 9,150,186 B1 | 10/2015 | Belwafa et al. | |
| 2003/0034637 A1* | 2/2003 | Wang | B60R 21/233 280/729 |
| 2004/0119270 A1* | 6/2004 | Gu | B60R 21/232 280/730.2 |
| 2005/0098985 A1* | 5/2005 | Sullivan | B60R 21/233 280/729 |
| 2006/0131847 A1* | 6/2006 | Sato | B60R 21/207 280/730.2 |
| 2007/0187932 A1* | 8/2007 | Sekizuka | B60R 21/233 280/730.1 |
| 2011/0018240 A1* | 1/2011 | Marable | B60R 21/231 280/728.3 |
| 2011/0148080 A1* | 6/2011 | Marable | B60R 21/233 280/730.2 |
| 2015/0158452 A1 | 6/2015 | Choi et al. | |
| 2016/0107603 A1 | 4/2016 | Lee | |
| 2016/0200280 A1* | 7/2016 | Fujiwara | B60N 2/42 280/729 |
| 2017/0028957 A1* | 2/2017 | Park | B60R 21/2035 |

OTHER PUBLICATIONS

Search Report from United Kingdom Intellectual Property Office dated Jan. 31, 2018 regarding Application No. GB1713484.2 (3 pages).

* cited by examiner

_US 9,944,248 B2_

AIRBAG INCLUDING A SECONDARY PANEL EXTENDING ACROSS A VALLEY DEFINING A SECONDARY CHAMBER

BACKGROUND

During a vehicle impact, occupants may move in a direction influenced by the momentum of a vehicle. Some vehicle impacts, e.g., side impact, frontal offset impacts, far side oblique impacts, near side oblique impacts, etc., may cause the occupants to move at an angle towards vehicle components, e.g., toward an A-pillar, hinge pillar, door, etc. In this situation, the momentum of the occupant may urge the head of the occupant to slide and/or rotate across a face of an inflated airbag.

DETAILED DESCRIPTION

Figure 1:
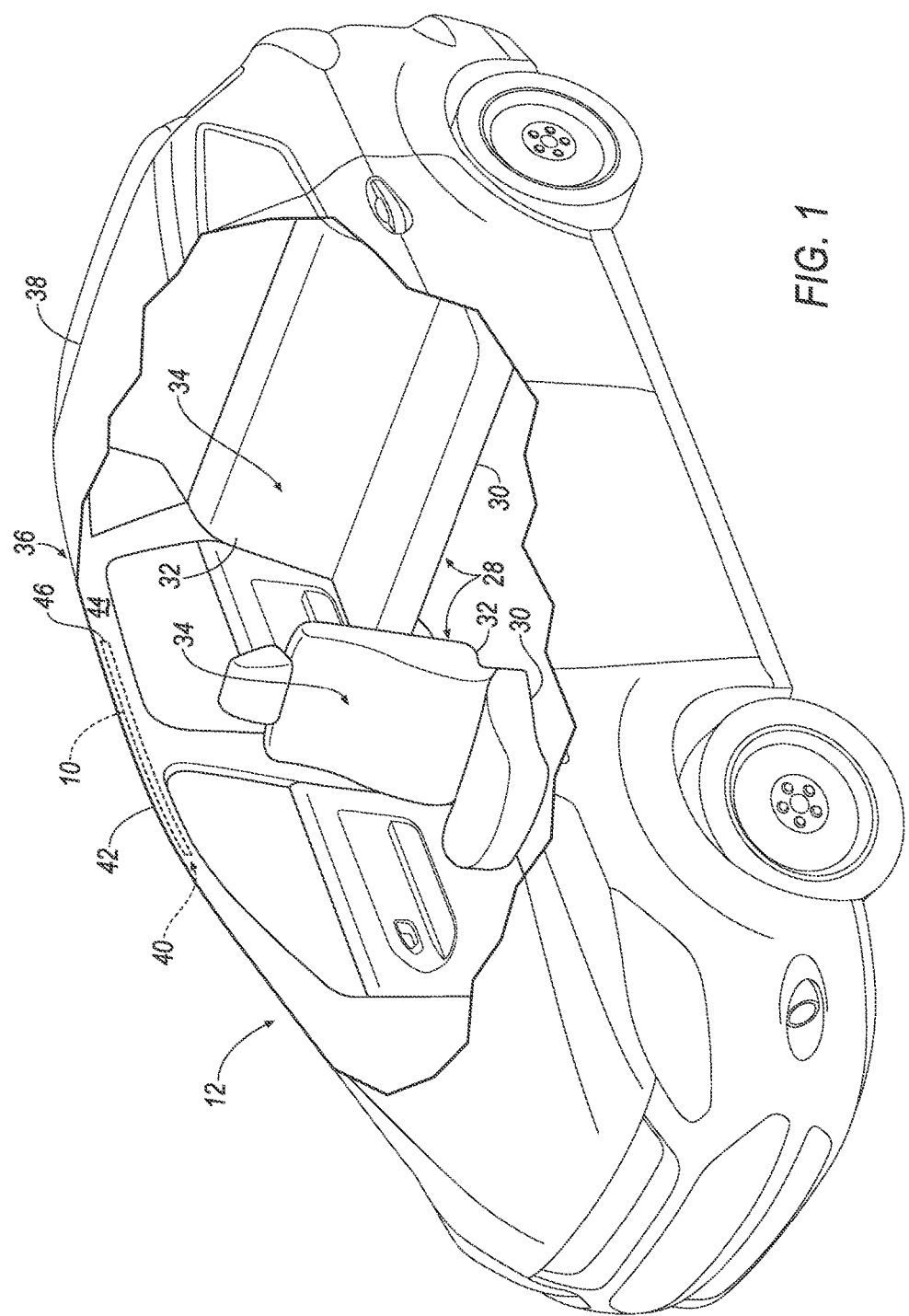
FIG. 1 is a perspective view of a vehicle including an airbag supported by a roof with the airbag in an uninflated position

With reference to the Figures, wherein like numerals indicate like parts throughout the several views, an airbag 10 of a vehicle 12 includes a panel 14 and a secondary panel 16. The panel defines an inflation chamber 18 inflatable to an inflated position and has a valley 20 in the inflated position. The secondary panel 16 is connected to the panel 14 on opposite sides 22 of the valley 20 and extends across the valley 20 to define a secondary chamber 24 between the secondary panel 16 and the panel 14. An opening 26 extends through the panel 14 from the inflation chamber 18 to the secondary chamber 24.

During a vehicle impact, the airbag 10 may be inflatable from an uninflated position, as shown in FIG. 1, to the inflated position (which is the same position as the inflated position of the inflation chamber 18 set forth above), as shown in FIGS. 2-8. During the vehicle impact, an occupant may be forced into the secondary panel 16 of the airbag 10 in the inflated position. Some vehicle impacts, e.g., side impact, frontal offset impacts, far side oblique impact, near side oblique impact, etc., may cause the occupants to move at an angle toward vehicle components, e.g., toward an A-pillar, hinge pillar, door, etc. During these types of impacts, the secondary panel 16 may slow or stop the head of the occupant from sliding across the airbag 10 to reduce the likelihood of the head of the occupant impacting components of the vehicle 12. In this situation, as the head of the occupant impacts the secondary panel 16, the secondary panel 16 collapses to absorb the energy from the occupant. In other words, the secondary panel 16 impacted by the occupant may collapse, and the panel 14 may remain in the inflated position. When the secondary panel 16 collapses when impacted by the occupant, the secondary panel 16 may create a cushion (not shown) around the head of the occupant to reduce the rotation of the head of the occupant. The secondary panel 16 may collapse to assist in limiting or preventing sliding of the head across the airbag 10 and/or head rotation after contact with the airbag 10, which may reduce head injury criteria (HIC) and/or brain injury criteria (BrIC). The design of the panel 14, the secondary panel 16, and the opening 26 may be tuned to achieve a desired relative stiffness of the panel 14 and the secondary panel 16.

The vehicle 12 may, for example, be any suitable type of automobile. For example, the vehicle 12 may be a sedan, a light duty automobile, a hybrid automobile, or any other suitable type of automobile. In other words, the vehicle 12 may be in any suitable automobile classification.

Figure 2:
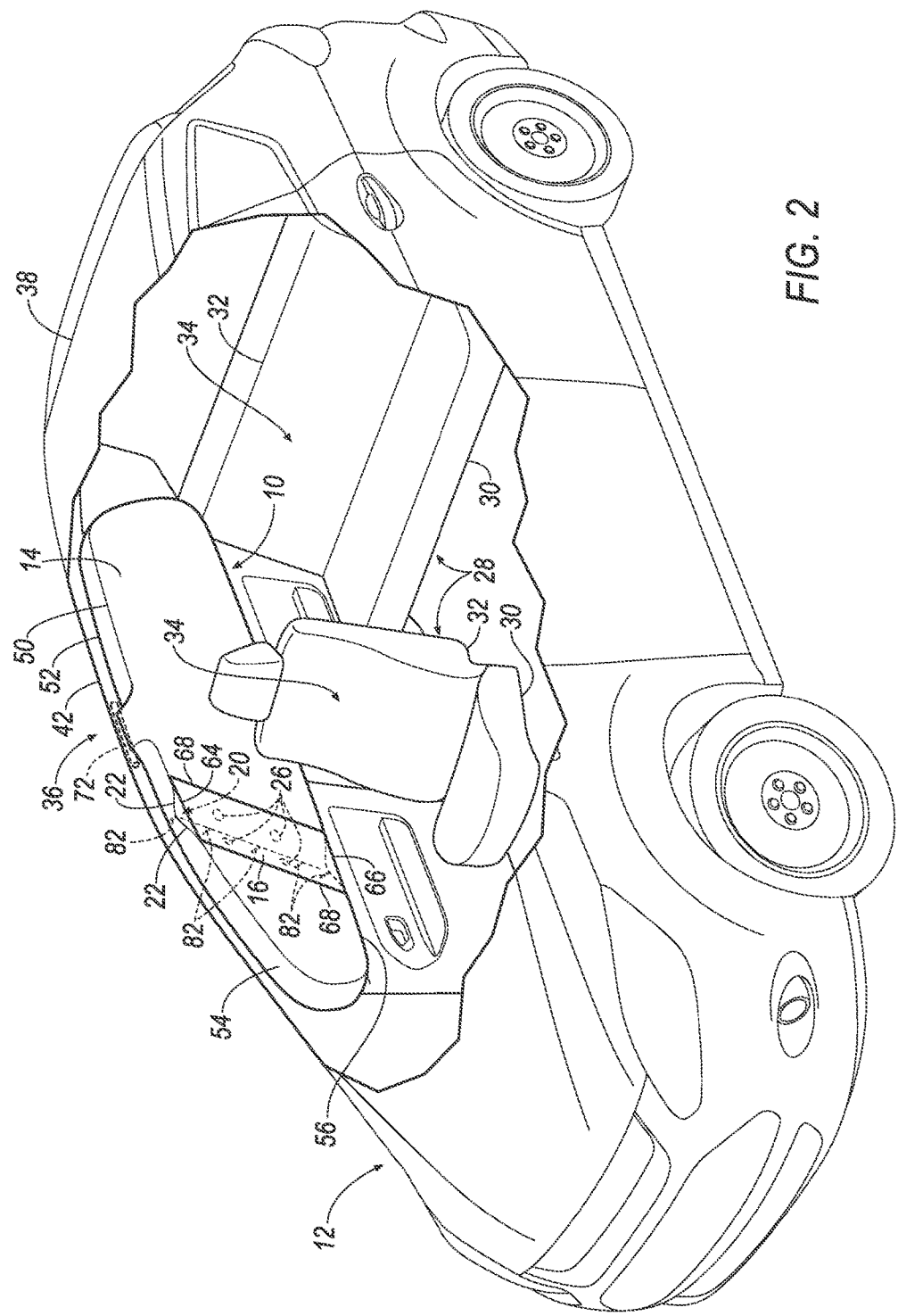
FIG. 2 is a perspective view of FIG. 1 including the airbag in an inflated position and including a secondary panel extending across a valley disposed adjacent to a seat.
Figure 5:
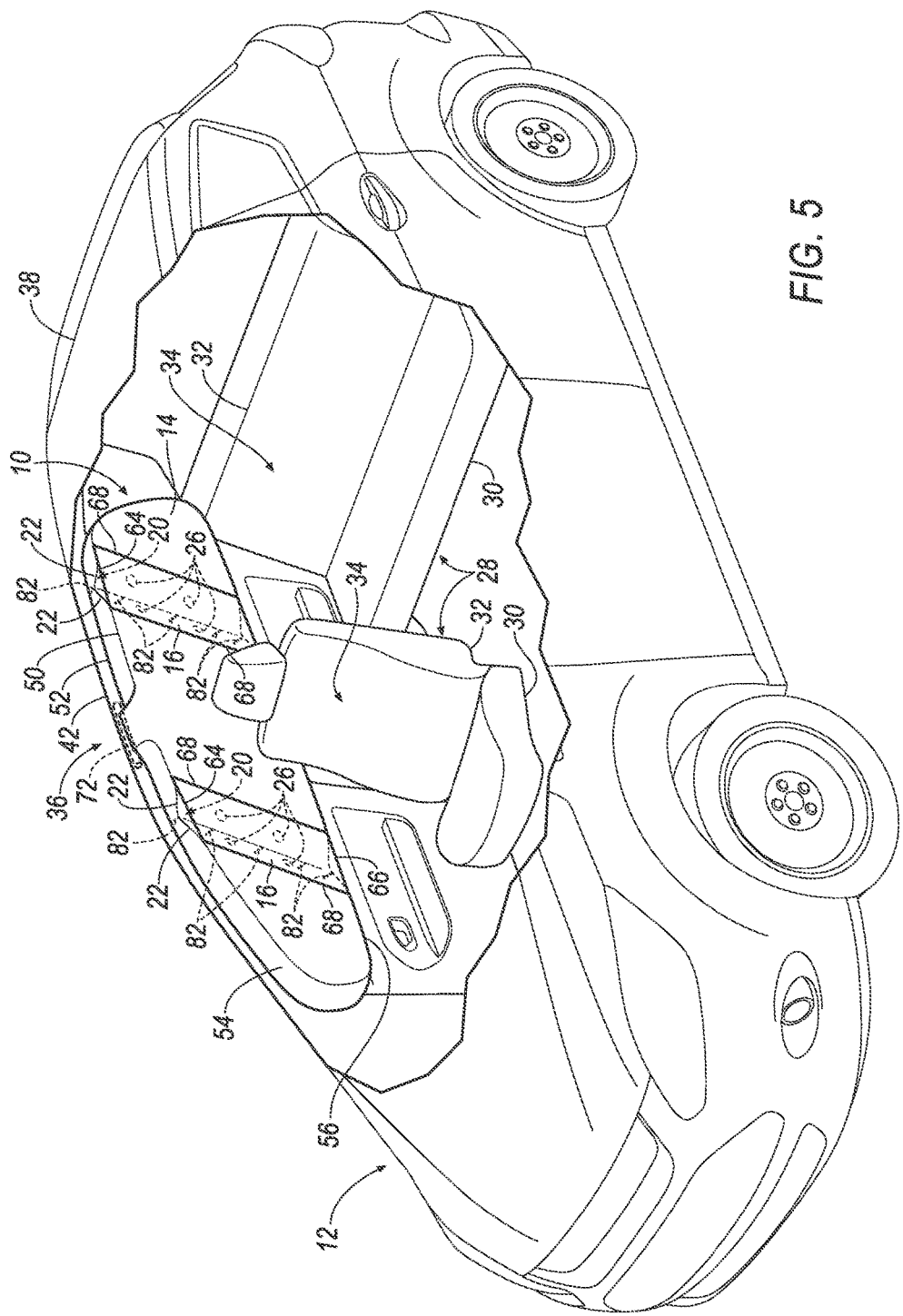
FIG. 5 is a perspective view of the vehicle including the airbag in the inflated position and including a plurality of secondary panels each extending across one valley disposed adjacent to each of the seat and a rear seat.
Figure 6:
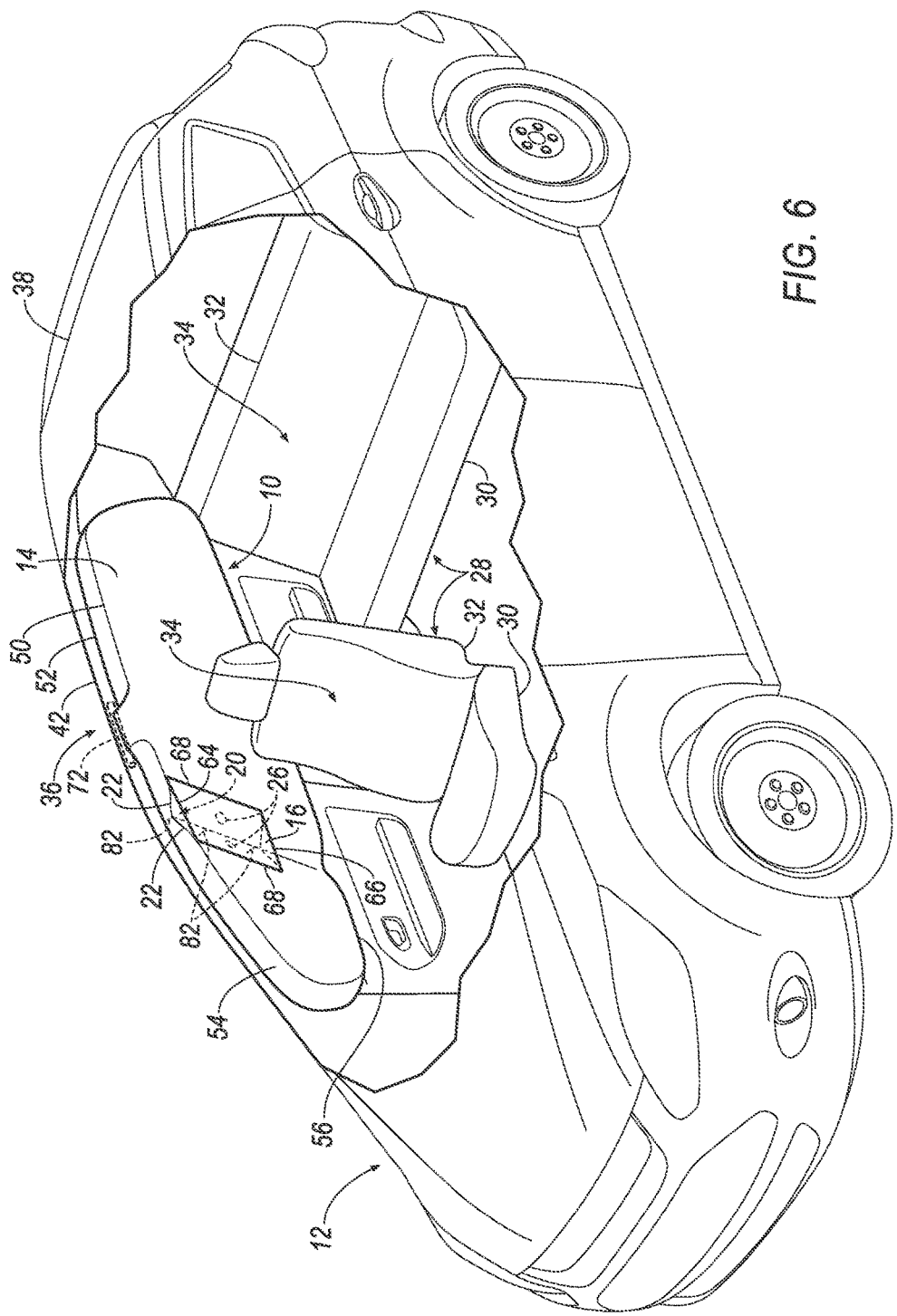
FIG. 6 is a perspective view of the vehicle including the airbag in the inflated position and including the secondary panel extending from a top end of the panel to a position between the top end and a bottom end of the panel.

As shown in FIG. 1, the vehicle 12 may include one or more seats 28. For example, as shown in the Figures, the seats 28 may be arranged in a front row and a rear row. Alternatively, the seats may be arranged in any suitable number of rows, i.e., one or more. The seats 28 and the airbag 10 may be arranged such that the airbag 10 is adjacent to the seats 28, i.e., the front row and the rear row, in the inflated position, as shown in FIGS. 2, 5 and 6. The seat 28 may be, for example, a bucket seat, a bench seat, a child seat, a booster seat, or any other suitable type of seat. The airbag 10 may include any suitable number of secondary panels 16 and valleys 20, e.g., one pair of secondary panel 16 and valley 20 for each row of seats of the vehicle 12, as shown in FIG. 5.

With continued reference to FIG. 1, the seat 28 may include a seat bottom 30. A seatback 32 may extend upwardly from the seat bottom 30 and may recline relative to the seat bottom 30. The seatback 32 and the seat bottom 30 may define an occupant region 34. The occupant region 34 may extend from the seat bottom 30 in a first direction towards a roof 38 and in a second direction from the seatback 32 along the roof 38. The occupant region 34 may extend any sufficient amount in each direction to contain the occupant, e.g., the head of the occupant, within the occupant region 34. As shown in FIGS. 2, 5 and 6, the secondary panel 16 may be disposed adjacent to the occupant region 34 when the airbag 10 is in the inflated position. In other words, the secondary panel 16 may be aligned with the head of the occupant when the occupant is in the seat 28.

Figure 3:
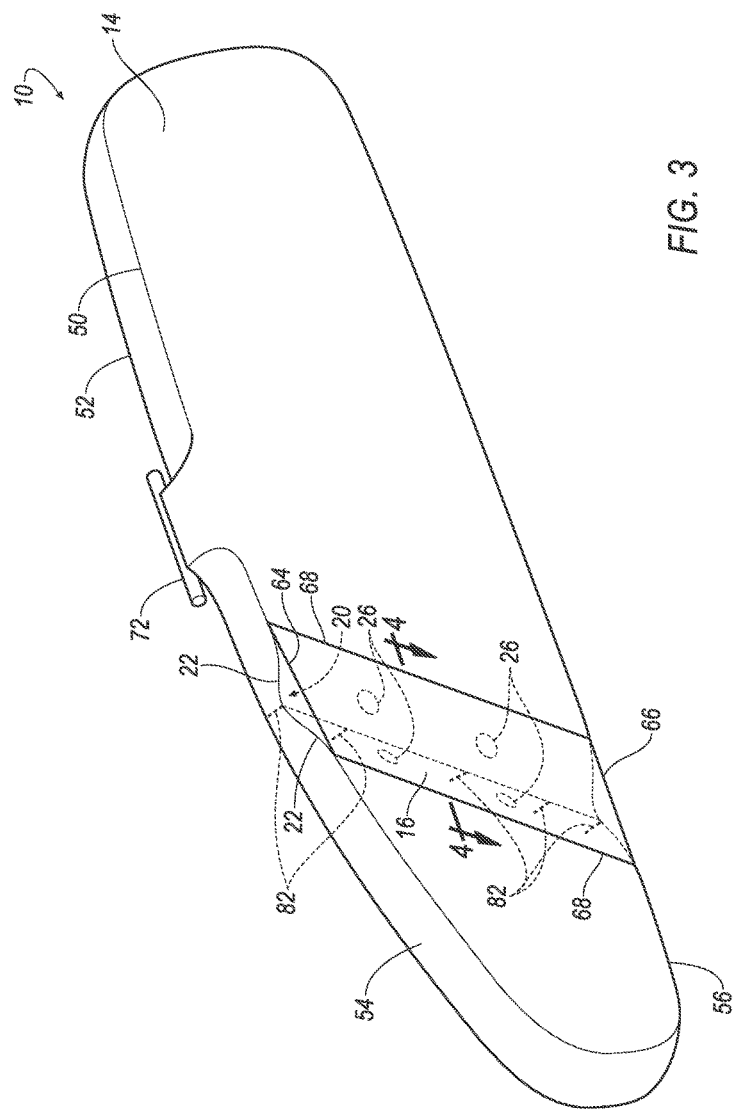
FIG. 3 is a perspective view of one embodiment of the airbag in the inflated position including an inflation chamber extending around the valley.

As shown in FIGS. 1-3, the vehicle 12 may include a passenger restraint system 36 having the roof 38 and an airbag assembly 40, which includes the airbag 10. The roof 38 may support the airbag assembly 40, and specifically, may support the airbag 10 when the airbag 10 is in the inflated position. The airbag assembly 40 may be mounted to the roof 38, as set forth below. When the airbag 10 is in the inflated position, the roof 38 may provide a counteracting force against the airbag 10 when the airbag 10 is impacted by the head of the occupant such that the airbag 10 is squeezed between the head of the occupant and the roof 38. The airbag 10 may be of the type referred to as a "side air curtain."

With continued reference to FIG. 1, the roof 38 may include a plurality of roof side rails 42 and a plurality of roof cross-beams (not shown) supported by the roof side rails 42. The roof 38 may include a headliner 44, as shown in FIG. 1, supported by the roof cross-beams. The headliner 44 may be disposed between occupant and the airbag 10 in the uninflated position. In other words, the airbag 10 may be disposed between the roof 38 and the headliner 44 in the uninflated position.

With continued reference to FIG. 1, the airbag assembly 40 may include a base 46 attached to the roof 38, and supporting the airbag 10. The base 46 may house the airbag 10 in the uninflated position and may support the airbag 10 on the roof 38 in the inflated position. The base 46 may, for example, include clips, panels, etc. for attaching the airbag 10 and for attaching the airbag assembly 40 to the roof 38, e.g., the roof side rails 42.

Figure 7:
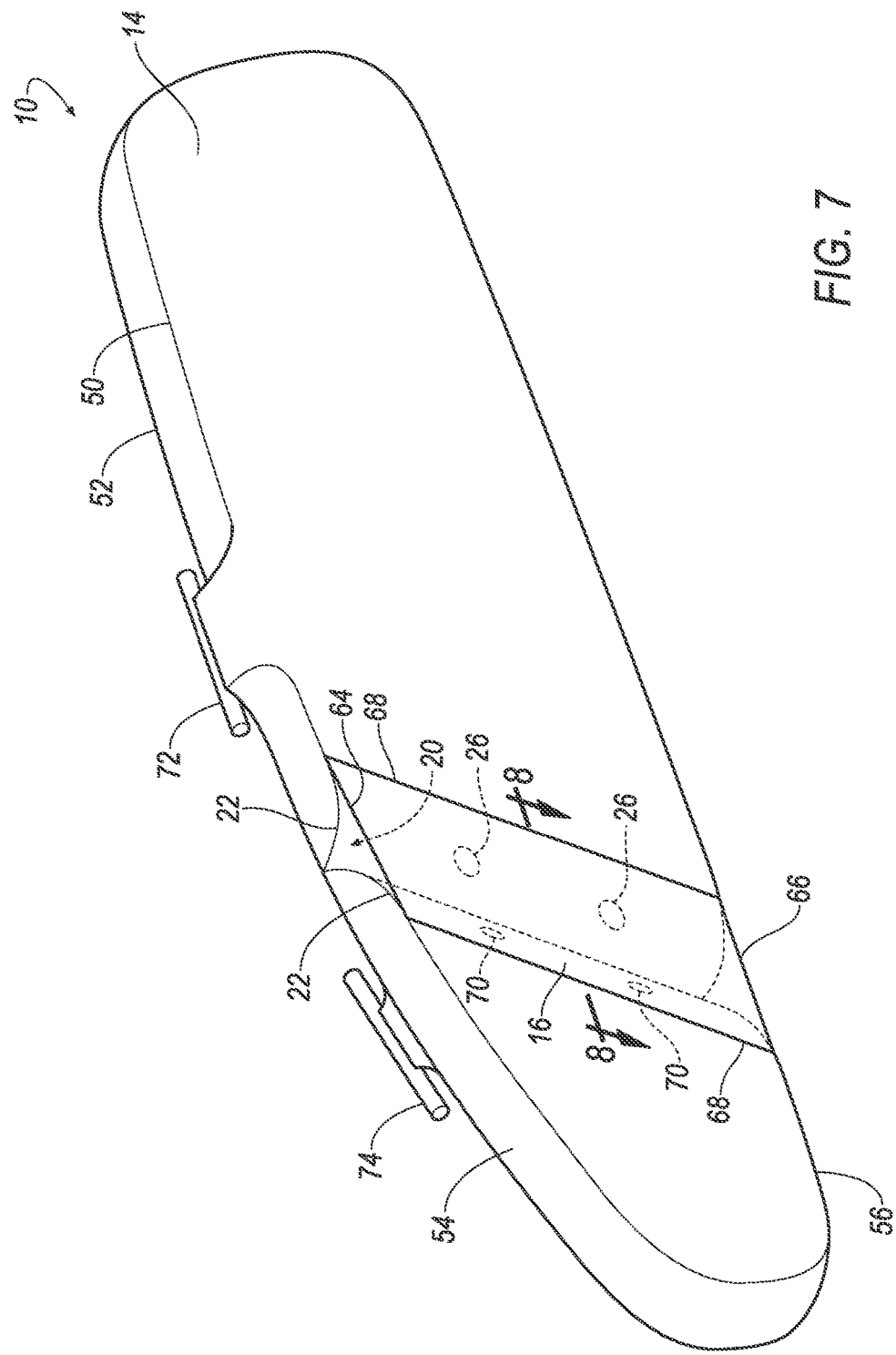
FIG. 7 is a perspective view of another embodiment of the airbag in the inflated position including the inflation chamber separated from a second inflation chamber by the valley.
Figure 8:
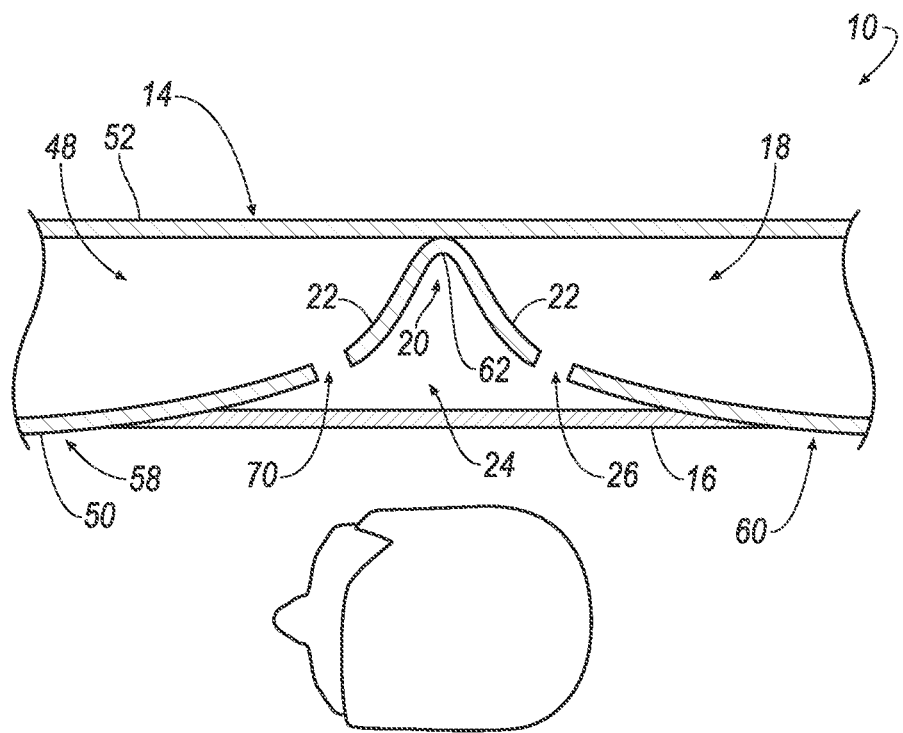
FIG. 8 is a cross-sectional view of the airbag along line 8 in FIG. 7 including the inflation chamber and the second inflation chamber on opposite sides of the valley.

As set forth further below, one embodiment of the airbag 10 is shown in FIGS. 2-6 and another embodiment of the airbag 10 is shown in FIGS. 7 and 8. Specifically, in the embodiment shown in FIG. 2-6, the inflation chamber 18 may extend around the valley 20 to the opposite sides 22 of the valley 20. In the embodiment shown in FIGS. 7 and 8, the airbag 10 includes a second inflation chamber 48. The valley 20 separates the inflation chamber 18 from the second inflation chamber 48. Common numerals are used to identify common features in the two embodiments. The airbag 10, alternatively, may include any suitable number of inflation chambers.

The airbag 10, e.g., the panel 14 and the secondary panel 16, may be formed of any suitable type of material, e.g., from a woven polymer. For example, the airbag 10 may be formed of woven nylon yarn, e.g., nylon 6. Other suitable exampled include polyether ether ketone (PEEK), polyetherketoneketone (PEKK), polyester, or any other suitable polymer. The woven polymer may include a coating such as silicone, neoprene, urethane, polyorganosiloxane, etc.

The panel 14 may be a single continuous unit, e.g., a single piece of fabric. Alternatively, the panel 14 may include a plurality of segments, i.e., two or more, connected to each other. For example, the panel 14 may include a first segment and a second segment connected to the first segment at any suitable location on the airbag 10, e.g., in the valley 20. The segments may be connected to each other in any suitable fashion, e.g., a plurality of panels connected by stitching, ultrasonic welding, etc. The panel 14, e.g., the first segment and/or the second segment, may be vented.

Figure 4:
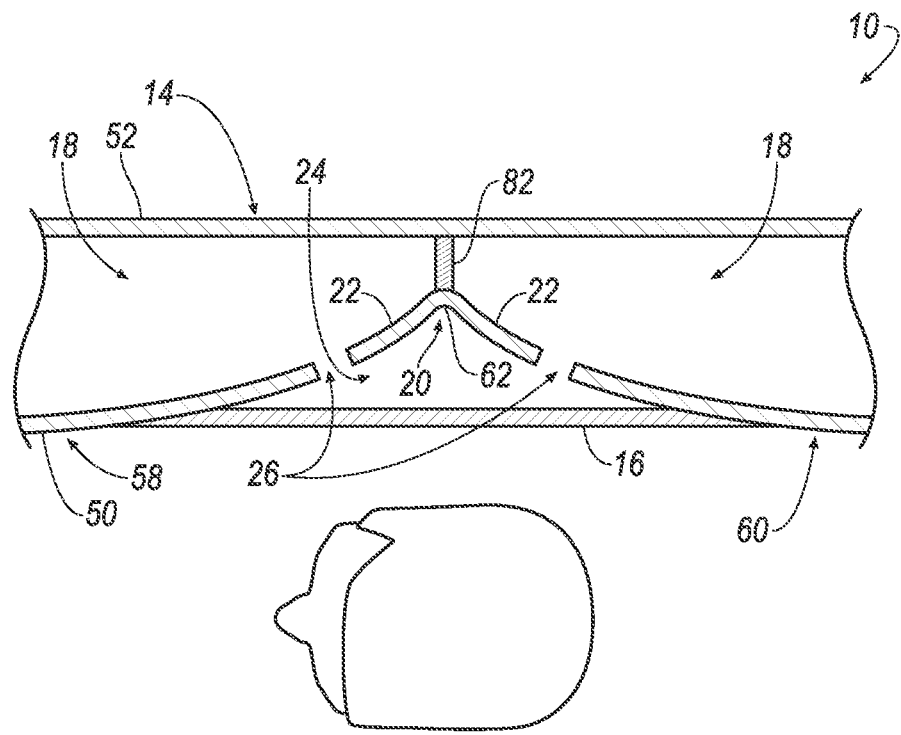
FIG. 4 is a cross-sectional view of the airbag along line 4 in FIG. 3 including the inflation chamber extending around the valley.

As shown in FIG. 4, the panel 14 may include an inboard side 50 and an outboard side 52 spaced from the inboard side 50 in the inflated position. For example, the inboard side 50 may be adjacent to the seat 28, i.e., the occupant region 34, in the inflated position. In other words, the inboard side 50 may be between the occupant and the inflation chamber 18 in the inflated position.

With continued reference to FIG. 4, the outboard side 52 of the panel 14 may be adjacent to the inflation chamber 18 and face away from the seat 28 in the inflated position. For example, the inflation chamber 18 may be disposed between the outboard side 52 of the panel 14 and the seat 28. In other words, the outboard side 52 of the panel 14 may be between the inflation chamber 18 and vehicle components, e.g., the door in the inflated position.

As shown in FIG. 3, the panel 14 may have a top end 54 adjacent to the roof 38 and a bottom end 56 opposite the top end 54 in the inflated position. The valley 20 may extend in a direction from the top end 54 to the bottom end 56 along the inboard side 50 of the panel 14. The valley 20 may extend any suitable length on the inboard side 50 of the panel 14. For example, the valley 20 may extend from the top end 54 to the bottom end 56. Alternatively, the valley 20 may be spaced from the top end 54 and/or the bottom end 56.

The panel 14, e.g., the inboard side 50 of the panel 14, may include a first lip 58 and a second lip 60 spaced from the first lip 58. As shown in FIG. 4, the first lip 58 and the second lip 60 may be generally planar in the inflated position. The second lip 60 may be spaced from the first lip 58 by any sufficient amount. For example, the second lip 60 may be spaced from the first lip 58 such that the head of an occupant may pass between the first lip 58 and the second lip 60 during the vehicle impact.

As shown in FIG. 4, the valley 20 may include a vertex 62 disposed on the inboard side 50 of the panel 14 depressed between the first lip 58 and the second lip 60. In other words, the vertex 62 may be disposed outboard of the first lip 58 and the second lip 60 on the inboard side 50 of the panel 14. The vertex 62 may be disposed at any suitable point between the first lip 58 and the second lip 60. For example, the vertex 62 may be disposed at a mid-point (not shown) between the lips or any other suitable point between the first lip 58 and the second lip 60. The vertex 62 may be rounded, as shown in FIG. 4. Alternatively, the vertex 62 may be angled.

With continued reference to FIG. 4, the vertex 62 may be attached to the outboard side 52 of the panel 14 across the inflation chamber 18. The vertex 62 may be attached to the outboard side 52 of the panel 14 along the valley 20, at the top end 54, at the bottom end 56, and/or at any other suitable position. For example, in the embodiment shown in FIGS. 2-6, the vertex 62 may be attached to the outboard side 52 of the panel 14 at a plurality of positions with tethers 82. In the embodiment shown in FIGS. 7 and 8, vertex may be attached to the outboard side 52 of the panel 14 along the valley 20 by stitching, ultrasonic welding, adhesive, or any other suitable attachment.

With reference to FIG. 4, the sides 22 of the valley 20 may have any suitable shape from the lip to the vertex 62. In other words, the valley 20 may have any suitable shape. For example, the sides 22 of the valley 20 may be curved, i.e., arced, away from each other. Alternatively, the sides 22 of the valley 20 may be straight, i.e., moving uniformly in one direction, or be curved towards each other. In other words, the valley 20 may have a curved V-shape, a V-shape, a U-Shape, or any other suitable shape.

The secondary panel 16 may have any suitable shape across the valley 20. For example, the secondary panel 16 may be generally planar in the inflated position, as shown in FIG. 4. Alternatively, the secondary panel 16 may extend across the valley 20 in a convex shape, a concave shape, or any other suitable shape.

The secondary panel 16 may extend a same or different distance as the valley 20 along the inboard side 50 of the panel 14. In other words, the secondary panel 16 may cover the valley 20 or partially cover the valley 20 in a direction from the top end 54 to the bottom end 56. For example, the secondary panel 16 and the valley 20 may extend from the top end 54 to the bottom end 56, as shown in FIG. 3. Alternatively, the secondary panel 16 and the valley 20 may extend from the top end 54 to any suitable position between the top end 54 and the bottom end 56, as shown in FIG. 6.

The secondary panel 16 encloses the valley 20, i.e., encloses the secondary chamber 24 between the secondary panel 16 and the valley 20. Specifically, the secondary panel 16 may be continuous, i.e., unvented, or may be vented to allow airflow from the secondary chamber 24 to the atmosphere. As shown in FIG. 2-8, the secondary panel 16 may include a top edge 64 extending across the valley 20, a bottom panel 66 spaced from the top panel 64, and sides 68 extending from the top panel 64 to the bottom panel 66. Each of the top panel 64, the bottom panel 66, and the sides 68 of the secondary panel 16 may be connected to the inboard side 50 of the panel 14. The top panel 64 and the bottom panel 66 of the secondary panel 16 may be connected to the inboard side 50 of the panel 14 in the valley 20, e.g., at the vertex 62.

The secondary panel 16 may be attached to the inboard side 50 of the panel 14 in any suitable manner. For example, the secondary panel 16 may be stitched to the inboard side 50 of the panel 14. Alternatively, the secondary panel 16 may be attached by adhesive, ultrasonic welding, or any other suitable attachment.

As shown in FIG. 4, the secondary panel 16 is external to the inflation chamber 18 of the panel 14. In other words, the secondary panel 16 is external to the panel 14 of the airbag 10, with the panel 14 disposed between the inflation chamber 18 and the secondary panel 16. The secondary panel 16 and the panel 14 may define the secondary chamber 24 between the secondary panel 16 and the panel 14, e.g., the valley 20. In other words, the secondary chamber 24 is enclosed by the secondary panel 16 and the panel 14, e.g., the valley 20, as set forth above. The secondary chamber 24 may be external to the inflation chamber 18 when the airbag 10 is in the inflated position. In the embodiment shown in FIGS. 2-6, the secondary chamber 24 may be in fluid communication with the inflation chamber 18, as set forth below. In the embodiment shown in FIGS. 7 and 8, the secondary chamber 24 may be in fluid communication with the inflation chamber 18 and the second inflation chamber 48, as set forth below.

The secondary panel 16 may have any suitable shape. For example, the secondary panel 16 may be rectangular. Alternatively, the secondary panel 16 may be square-shaped, trapezoid-shaped, parallelogram-shaped, or any other suitable shape.

In the embodiment shown in FIGS. 2-6, the inflation chamber 18 may be adjacent to both sides 22 of the valley 20. For example, the inflation chamber 18 may extend around the vertex 62 to the opposite sides 22 of the valley 20. In other words, the inflation chamber 18 may be in fluid communication with both sides 22 of the valley 20. In the embodiment shown in FIGS. 7 and 8, the panel 14 may define the second inflation chamber 48 separated from the inflation chamber 18 by the valley 20. The second inflation chamber 48 and the inflation chamber 18 may be disposed on opposite sides 22 of the valley 20. The second inflation chamber 48 and the inflation chamber 18 may be disconnected from each other by the panel 14. In other words, the panel 14 may prevent fluid communication between the second inflation chamber 48 and the inflation chamber 18.

In the embodiment shown in FIGS. 2-6, the opening 26 may extend through the panel 14 from the inflation chamber 18 to the secondary chamber 24. In other words, the opening 26 may extend through the panel 14 in the valley 20. As set forth above, the inflation chamber 18 and the secondary chamber 24 may be in fluid communication through the openings 26, 70. Any suitable number of openings may extend through the panel 14 to allow communication between the inflation chamber 18 and the secondary chamber 24. In the embodiment shown in FIGS. 7 and 8, a second opening 70 may extend through the panel 14 from the second inflation chamber 48 to the secondary chamber 24. In other words, the second opening 70 may extend through the panel 14 in the valley 20. As set forth above, the second inflation chamber 48 and the secondary chamber 24 may be in fluid communication through the second opening 70. Any suitable number of openings may extend through the panel 14 to allow communication between the second inflation chamber 48 and the secondary chamber 24. The opening 26 and the second opening 70 may have a same or different size and shape. For example, the opening 26 and the second opening 70 may have any suitable shape, e.g., circular, and any suitable size, i.e., diameter, perimeter, etc.

The airbag assembly 40 may include an inflator 72 in fluid communication with the airbag 10 that inflates the airbag 10 from the uninflated position to the inflated position. The inflator 72 expands the airbag 10 with an inflation medium, such as a gas, to move the airbag 10 from the uninflated position to the inflated position. Specifically, the inflator 72 may be in communication with the inflation chamber 18 and/or the second inflation chamber 48 to supply the inflation medium to the inflation chamber 18 and/or the second inflation chamber 48. As one example, as shown in FIG. 7, the inflator 72 may be in fluid communication with the inflation chamber 18, and the airbag assembly 40 may include a second inflator 74 in fluid communication with the second inflation chamber 48 to supply the inflation medium to the second inflation chamber 48. Alternatively, the inflator 72 may be in fluid communication with both the inflation chamber 18 and the second inflation chamber 48, e.g., through direct communication, through fill tubes, etc.

The inflator 72 may be supported by the roof 38, e.g., disposed in the base 46 of the airbag assembly 40, or mounted directly to the roof side rail, as shown in FIG. 1. Alternatively, the inflator 72 may be disposed at any other suitable part of the vehicle 12, e.g., at the pillars.

The inflator 72 may be, for example, a pyrotechnic inflator that uses a chemical reaction to drive the inflation medium into the airbag 10. Alternatively, the inflator 72 may be, for example, a cold-gas inflator that, when activated, ignites a pyrotechnic charge that creates an opening for releasing the pressurized inflation medium to the airbag 10 via a fill tube (not shown). Alternatively, the inflator 72 may be of any suitable type, for example, a hybrid inflator.

Figure 9:
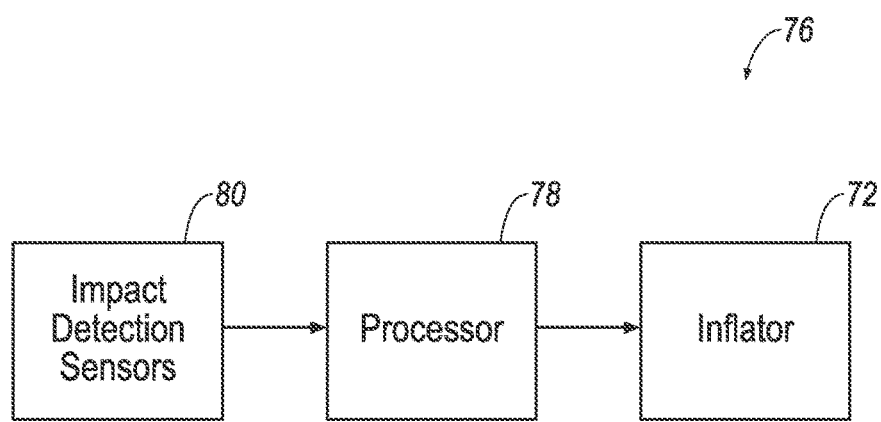
FIG. 9 is a flowchart of an inflation system of the vehicle.

With reference to FIG. 9, the vehicle 12 may include an inflation system 76. The inflation system 76 includes a processor 78 programmed to initiate an inflation of the airbag 10 in response to the vehicle impact. The processor 78 may be embedded in a microcontroller. The microcontroller may include memory, etc. The memory of the microcontroller may store instructions executable by the processor 78 and the processor 78 may read the instructions from the memory and execute the instructions.

The vehicle 12 may include impact detection sensors 80 programmed to detect the vehicle impact to the vehicle 12. The impact detection sensors 80 may be disposed in the roof 38 or elsewhere in the vehicle 12. The impact detection sensors 80 may be of various types, e.g., pressure sensor, acceleration sensor, vision sensor, etc. When the vehicle impact occurs, the processor 78 may receive one or more signals from the impact detection sensors 80 indicating the vehicle impact. In response to receiving the signals from the impact detection sensors 80, the processor 78 may initiate the inflation of the airbag 10. Alternatively, the processor 78 may initiate the inflation of the airbag 10 selectively based on information from the impact detection sensors 80 identifying the physical characteristics of the vehicle impact, e.g., which side of the vehicle impacted, amount of pressure applied to the vehicle 12, etc. and also seat occupancy information, e.g., by using the occupancy sensors disposed inside the seats 28 sensing the occupancy status of the seats 28.

In order to receive the signals from the impact detection sensors 80 and to initiate the inflation of the airbag 10, the processor 78 communicates with the impact detection sensors 80 and the inflator 72, e.g., through a direct electrical wiring, through which an analog or a digital signal is transmitted, or through a communication network like CAN (Control Area Network), Ethernet, LIN (Local Interconnect Network) or any other way.

In operation, the airbag 10 is in the uninflated position, as shown in FIG. 1, under normal operating conditions of the vehicle 12. When the impact detection sensor senses an impact of the vehicle 12, the processor 78 triggers the inflator 72 to inflate the airbag 10 with the inflation medium from the uninflated position to the inflated position. When the inflator 72 inflates the airbag 10 to the inflated position, as shown in the embodiment of FIGS. 2-6, the inflation medium flows to the inflation chamber 18 increasing the pressure in the inflation chamber 18, or, as shown in the embodiment of FIGS. 7 and 8, the inflation medium flows, e.g., from the inflator 72 or the first and second inflator, to the inflation chamber 18 and the second inflation chamber 48 increasing the pressure in the inflation chamber 18 and the second inflation chamber 48. As the pressure is increased in the inflation chamber 18, the inflation medium flows to the secondary chamber 24 through the openings 26, 70 in the panel 14. As the occupant moves within the vehicle 12 due to the momentum of the vehicle impact, the occupant may move towards the secondary panel 16. When the occupant impacts the secondary panel 16, the secondary panel 16 may collapse to absorb energy from the occupant. Specifically, the secondary panel 16 may absorb energy from the head and upper torso of the occupant to reduce the rotation of the head of the occupant. The secondary chamber 24 may have a lower pressure than the inflation chamber 18 when the occupant impacts the secondary panel 16. In this situation, the secondary panel 16 may collapse and create a cushion while the panel 14 remains in the inflated position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag comprising;
a panel defining an inflation chamber inflatable to an inflated position, the panel having a top end and a bottom end spaced from the top end and a valley in the inflated position extending in a direction from the top end to the bottom end;
a secondary panel connected to the panel on opposite sides of the valley and extending across the valley to define a secondary chamber between the secondary panel and the panel; and
an opening extending through the panel from the inflation chamber to the secondary chamber.

2. The airbag according to claim 1, wherein the secondary panel includes a top edge, a bottom edge spaced from the top edge, and sides extending from the top edge to the bottom edge, each of the top edge, bottom edge and sides connected to the panel.

3. The airbag according to claim 1, wherein the secondary panel is connected to the panel in the valley.

4. The airbag according to claim 1, wherein the secondary panel is external to the inflation chamber.

5. The airbag according to claim 1, wherein the secondary panel is generally planar when the panel is in the inflated position.

6. The airbag according to claim 1, wherein the panel defines a second inflation chamber separated from the inflation chamber by the valley, and wherein the second inflation chamber and the inflation chamber are disposed on opposite sides of the valley.

7. The airbag according to claim 6, further comprising a second opening extending through the panel from the second inflation chamber to the secondary chamber.

8. The airbag according to claim 7, wherein the panel separates the inflation chamber and the second inflation chamber to prevent fluid communication there between.

9. The airbag according to claim 1, wherein the panel includes a first segment and a second segment connected to the first segment in the valley.

10. A system comprising:
a roof;
an airbag supported by the roof and being inflatable away from the roof to an inflated position, the airbag including a panel having a valley in the inflated position;
a secondary panel connected to the panel on opposite sides of the valley and extending across the valley to define a secondary chamber between the secondary panel and the panel;
an opening extending through the panel to the secondary chamber; and
wherein the panel includes a top end adjacent to the roof and a bottom end opposite the top end, and wherein the valley extends in a direction from the top end to the bottom end in the inflated position.

11. The system according to claim 10, wherein the secondary panel includes a top edge, a bottom edge spaced from the top edge, and sides extending from the top edge to the bottom edge, each of the top edge, bottom edge and sides connected to the panel.

12. The system according to claim 10, wherein the secondary panel is connected to the panel in the valley.

13. The system according to claim 10, wherein the secondary panel is generally planar when the panel is in the inflated position.

14. The system according to claim 10, wherein the panel defines an inflation chamber, and wherein the secondary panel is external to the inflation chamber.

15. The system according to claim 10, wherein the panel defines a second inflation chamber separated from the inflation chamber by the valley, and wherein the second inflation chamber and the inflation chamber are disposed on opposite sides of the valley.

16. The system according to claim 15, further comprising a second opening extending through the panel from the second inflation chamber to the secondary chamber.

17. The system according to claim 16, wherein the panel separates the inflation chamber and the second inflation chamber to prevent fluid communication there between.

18. The system according to claim 10, further comprising a seat including a seat bottom and a seatback extending upwardly from the seat bottom, and wherein the seat bottom and the seatback define an occupant region, the secondary panel being disposed adjacent to the occupant region when the panel is in the inflated position.

19. The system according to claim 10, wherein the panel includes a first segment and a second segment connected to the first segment in the valley.

20. A system comprising:
a roof;
an airbag supported by the roof and being inflatable away from the roof to an inflated position, the airbag including a panel having a valley in the inflated position;
a secondary panel connected to the panel on opposite sides of the valley and extending across the valley to define a secondary chamber between the secondary panel and the panel;
an opening extending through the panel to the secondary chamber; and
wherein the secondary panel is connected to the panel in the valley.

21. An airbag comprising;
a panel defining an inflation chamber inflatable to an inflated position, the panel having a valley in the inflated position;
a secondary panel connected to the panel on opposite sides of the valley and extending across the valley to define a secondary chamber between the secondary panel and the panel;
an opening extending through the panel from the inflation chamber to the secondary chamber;
wherein the panel defines a second inflation chamber separated from the inflation chamber by the valley, and wherein the second inflation chamber and the inflation chamber are disposed on opposite sides of the valley;
a second opening extending through the panel from the second inflation chamber to the secondary chamber; and
wherein the panel separates the inflation chamber and the second inflation chamber to prevent fluid communication there between.

22. A system comprising:
a roof;
an airbag supported by the roof and being inflatable away from the roof to an inflated position, the airbag including a panel having a valley in the inflated position;
a secondary panel connected to the panel on opposite sides of the valley and extending across the valley to define a secondary chamber between the secondary panel and the panel;
an opening extending through the panel to the secondary chamber;
wherein the panel defines a second inflation chamber separated from the inflation chamber by the valley, and wherein the second inflation chamber and the inflation chamber are disposed on opposite sides of the valley;
a second opening extending through the panel from the second inflation chamber to the secondary chamber; and
wherein the panel separates the inflation chamber and the second inflation chamber to prevent fluid communication there between.

\* \* \* \* \*